United States Patent [19]
Storm

[11] 3,768,974
[45] Oct. 30, 1973

[54] DISPOSABLE COLORIMETRIC INDICATOR DEVICE FOR MEASURING THE CONCENTRATION OF CHLORINE IN WATER

[75] Inventor: Lester F. M. Storm, Glendale, Calif.

[73] Assignee: Sterilizer Control Royalties, North Hollywood, Calif.

[22] Filed: Mar. 22, 1971

[21] Appl. No.: 126,956

[52] U.S. Cl. .................. 23/253 R, 23/259, 252/408
[51] Int. Cl. .......................................... G01n 31/22
[58] Field of Search ..................... 23/230, 232, 253, 23/254, 259; 252/408

[56] References Cited
UNITED STATES PATENTS
| | | | |
|---|---|---|---|
| 3,329,486 | 7/1967 | Rupe | 252/408 |
| 3,620,676 | 11/1971 | Davis | 23/253 TP |
| 3,634,038 | 1/1972 | Rampy | 23/253 TP X |

OTHER PUBLICATIONS

Welcher, F.J.; Organic Analytical Reagents, Vol. IV, p. 473, 1948, QD77W43.
Britton, H.T.S.; Hydrogen Ions, Vol. I, p. 358, 359, 1943, QD561B7.

Primary Examiner—Robert M. Reese
Attorney—Miner L. Hartmann

[57] ABSTRACT

A disposable plastic syringe contains a measured quantity of a water-soluble colorimetric reagent composition proportioned to the volume of water sample which may be drawn into the syringe. The color produced in the water sample is compared to a chart standard which indicates the concentration of chlorine in the water sample. The measured quantity of the reagent composition is preferably applied as a dried printed spot applied to an inside surface of the syringe device.

6 Claims, 6 Drawing Figures

PATENTED OCT 30 1973 3,768,974

3,768,974

DISPOSABLE COLORIMETRIC INDICATOR DEVICE FOR MEASURING THE CONCENTRATION OF CHLORINE IN WATER

BACKGROUND OF THE INVENTION

This invention relates to a device for measuring the concentration of chlorine in water. It is especially applicable for use in regulating the quality of the water in swimming pools, but is applicable to related uses where it is desirable to know the concentration of chlorine in water.

SUMMARY OF THE INVENTION

In general, the device consists of a disposable syringe which contains a colorimetric indicator material, preferably in dried form, which when dissolved in the water to be tested, produces one of a number of distinguishable colors. When a given weight of the indicator material is dissolved in a fixed amount of the water to be tested, the chlorine content per unit volume is immediately ascertained by comparison of the colored sample with the colors reproduced on a printed chart. The preferred device consists of a small disposable syringe made of transparent plastic sheet, which contains within its bulb a tablet or printed "spot" of the colorimetric reagent, in weight corresponding to the volume of water sample which will subsequently be drawn into the syringe. When the water sample is drawn into the syringe, and the device shaken to dissolve the indicator material, the color produced measures the chlorine concentration.

The principal object of the invention is to provide an inexpensive disposable syringe which will draw in a known volume of water to be tested and which contains an amount of a wide range colorimetric reagent for chlorine, which measures the concentration of the chlorine in the drawn in sample. The colorimetric reagent is selected for its wide range of distinguishable colors corresponding to the expected range of concentration of chlorine in the water to be tested, for example, swimming pool water.

Figure 1:
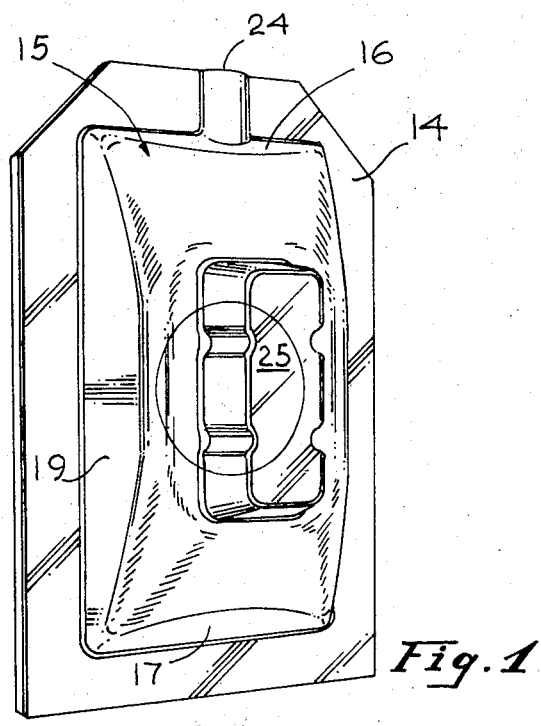
FIG. 1 is a perspective view of one form of the syringe device.
Figure 2:
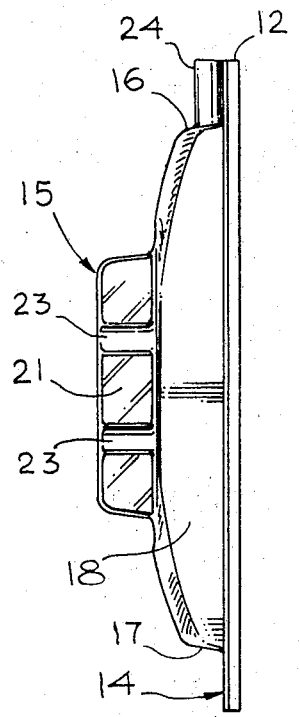
FIG. 2 is a side elevation view thereof.
Figure 3:
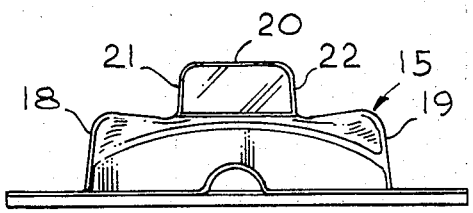
FIG. 3 is an elevational view from the inlet tube end of the device.
Figure 4:
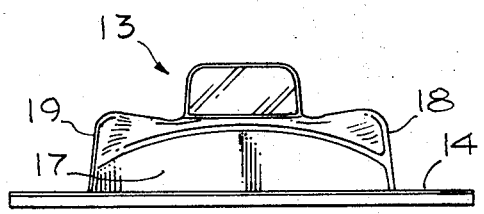
FIG. 4 is an elevational view of the end opposite the tube.
Figure 5:
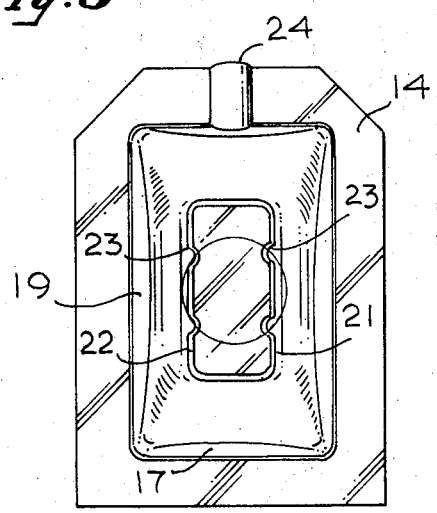
FIG. 5 is a top elevational view.
Figure 6:
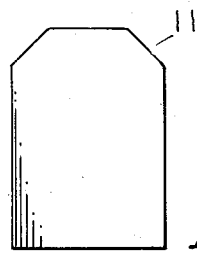
FIG. 6 is a bottom elevational view.

The preferred form of syringe for use in this invention is that shown in co-pending application Ser. No. 112,234, now U.S. Pat. No. 3,732,079. Other syringe forms which meet the requirements as set forth may also be employed.

DESCRIPTION OF A PREFERRED EMBODIMENT

This syringe-like device consists of a rigid base 11, which is a plane piece of plastic coated hard cardboard 12 to which a formed plastic bulb 13 imprint is attached (as by heat sealing) at its outwardly projecting flanges 14, to form a water holding container or bulb 13. The bulb consists of a rectangular pyramidal-shaped sheet plastic body 15 with its walls 16, 17, 18, 19 tapering upwardly and joined to the walls of a rectangular turret 20 which constitutes the "buttom" upon which finger-pressure is applied in the operation of the device. The side-walls 21 and 22 of the turret are stiffened by two vertical indented flutes 23. The flutes 23 strengthen the structure of the turret so that it moves downwardly as a unit upon applying pressure of the finger, to constrict the total volume of the bulb, and, upon the releasing of the finger pressure, is restored to its original position because of the inherent resiliency of the synthetic plastic material, for examples, polyvinyl chloride or styrene, of which the device is formed. The sheet thickness is preferably in the range of 6 to 10 mils.

An inlet tube 24 connecting the bulb 13 to the outer edge is formed by molding a rounded groove in the flange 14 adjacent the end wall 16, and this groove forms a tubular opening when the bulb imprint is sealed to the base.

A plurality of bulb cavities may be molded from large sheets, and subsequently be die cut into the individual units before or after heat-sealing the formed sheet at the flanges between units to the plastic coated cardboard base. Each base sheet before assembly is printed, flexographically, in spots or stripes which are positioned to be within the bulb, using a printing ink comprising a color-change indicator composition for chlorine. The syringe may be used only once, and is then discarded.

The indicator spot 25 or a stripe is printed with a suitable printing ink composition. One such composition comprises as its principal colorimetric ingredient ortho tolidine dihydrochloride, which gives a range of yellow shades corresponding to the chlorine content. Other colorimetric indicator dyes are triphenyl methane leuco bases, which produce colors ranging from yellow to blue to red.

The preferred colorimetric reagent consists of acid fuchsin mixed with ortho tolidine dihydrochloride. It has been found that the addition of a small proportion of potassium bromide improves the brilliance of the colors produced. The hydrogen ion concentration or pH of the water sample must also be controlled to a range of 3.8 to 4.2 in order for the proper functioning of the colorimetric indicator, and this is accomplished by adding a buffering agent such as potassium aluminum sulfate.

A preferred ink composition for silk screen printing to produce the spot of reagent on the inside of the plastic syringe, for measuring the chlorine content of the water, is as follows:

Acid Fuchsin — 8 parts by weight
Ortho tolidine dihydrochloride — 40 parts by weight
Potassium bromide — 750 parts by weight
Aluminum Potassium Sulfate 12. $H_2O$ — 1,000 parts by weight
Polyvinylpyrrolidone (binder) — 183 parts by weight
Total Solids — 1,981 parts by weight
Amyl Alcohol (Vehicle) — 2,038 parts by weight The consistency of the ink may be varied as required for a chosen printing operation by changing the proportion of the vehicle.

The vehicle evaporates upon the drying of the ink, leaving the other ingredients in the proportions shown.

If the amount of water sample drawn into the syringe device is in the range of 0.9 to 1.1 milliliters, then the weight of the dried ink spot should be 1.981 milligrams, in order that the colorimetric reagent will be of the proper concentration to produce the indicative color in the water sample, as defined by the color chart. The reaction of the color dye combination with the chlorine in the sample is stoichiometric.

The preferred ink composition (after drying off the vehicle) will give the following standard colors when added to the measured quantity of water in the syringe device, as described, and will, for the stated concentrations of chlorine, yield the identifiable colors as named and numbered in the following chart:

CHART A

| ppM Chlorine | Centroid Color ISCC-NBS name and number |
|---|---|
| 0 | Light purplish Pink, 249 |
| 1 | Very light Purple, 221 |
| 2 | Very pale Violet, 213 |
| 3 | Light Blue, 181 |
| 4 | Light Greenish Blue, 172 |
| 5 | Light Bluish Green, 163 |
| 6 | Brilliant Green, 140 |
| 7 | Very Yellowish Green, 115 |
| 8 | Light Olive, 106 |
| 9 | Medium Olive Brown, 95 |
| 10 | Medium Yellowish Brown, 77 |
| 11 | Deep Orange Brown, 69 |
| 12 | Strong Red Orange, 35 |
| 13 | Very Orange, 48 |

The proportions of the several dry ingredients may be varied through the ranges shown below, although the colors and color numbers will be somewhat different from those given in the above chart for the preferred composition.

Acid fuchsin — from 0.8 to 80 parts
Ortho tolidine 2HCl — from 4 to 400 parts
Potassium Bromide — from 375 to 1,500 parts
Aluminum Potassium Sulfate 12H$_2$O — from 500 to 2,000 parts
Polyvinyl Pyrrolidone — from 183 to 1,830 parts

I claim:

1. A disposable chlorine measuring device for testing water samples comprising a transparent plastic syringe device having a cavity with one end open, the other end being closed by a finger-compressible enlargement, said syringe device containing a dry color-change dye composition which is soluble in water, said composition consisting essentially of a mixture of acid fuchsin and orthotolidine dihydrochloride, a water soluble binder, said composition having been applied as a printing ink to its inside cavity surface.

2. The device defined in claim 1, in which the composition also contains a pH buffering salt.

3. The device defined in claim 1, in which the composition also contains potassium aluminum sulfate in an amount to control the pH of the water sample to a range of 3.8 to 4.2.

4. The device defined in claim 1 in which the composition also contains as a color brightener a water soluble bromide salt.

5. A water soluble composition for colorimetrically measuring the concentration of chlorine in a sample of water, comprising Acid fuchsin — 0.8 to 80 parts by weight;
ortho tolidine dihydrochloride — 4 to 400 parts by weight;
potassium bromide — 375 to 1,500 parts by weight;
aluminum potassium sulfate 12H$_2$O — 500 to 2,000 parts by weight and a water soluble binder in effective proportion.

6. The composition defined in claim 5 in which said added binder is polyvinyl pyrrolidone in effective proportion.

* * * * *